(12) United States Patent
Brinkmann et al.

(10) Patent No.: US 11,320,007 B2
(45) Date of Patent: May 3, 2022

(54) METHOD FOR MONITORING THE FUNCTIONS OF A FRICTION CLUTCH

(71) Applicant: WABCO GMBH, Hannover (DE)

(72) Inventors: Stefan Brinkmann, Wunstorf (DE); Dirk Hillbring, Celle (DE); Konrad Feyerabend, Hannover (DE); Volker Gniesmer, Alfeld (DE); Ralf Stoffels, Gerdau (DE)

(73) Assignee: ZF CV SYSTEMS HANNOVER GMBH, Hannover (DE)

( * ) Notice: Subject to any disclaimer, the term of this patent is extended or adjusted under 35 U.S.C. 154(b) by 118 days.

(21) Appl. No.: 16/975,112

(22) PCT Filed: Feb. 19, 2019

(86) PCT No.: PCT/EP2019/054067
§ 371 (c)(1),
(2) Date: Aug. 21, 2020

(87) PCT Pub. No.: WO2019/162261
PCT Pub. Date: Aug. 29, 2019

(65) Prior Publication Data
US 2021/0381560 A1  Dec. 9, 2021

(30) Foreign Application Priority Data
Feb. 23, 2018 (DE) .......................... 102018104161.6

(51) Int. Cl.
*F16D 48/06* (2006.01)
*F16D 25/00* (2006.01)
(Continued)

(52) U.S. Cl.
CPC .......... *F16D 48/066* (2013.01); *F16D 25/00* (2013.01); *G07C 5/004* (2013.01); *G07C 5/0825* (2013.01);
(Continued)

(58) Field of Classification Search
CPC ................... F16D 48/066; F16D 25/00; F16D 2500/1028; F16D 2500/10437;
(Continued)

(56) References Cited

U.S. PATENT DOCUMENTS 4,635,769 A    1/1987  de Hertel Eastcott
5,273,143 A *  12/1993 Voss ...................... F16D 48/066
                                                    192/85.01
(Continued)

FOREIGN PATENT DOCUMENTS

DE  102006023632 A1  11/2007
DE  102008003957 A1  12/2008
(Continued)

OTHER PUBLICATIONS

English translation of International Search Report for PCT/EP2019/054067 dated Jun. 24, 2019, 2 pages.
(Continued)

*Primary Examiner* — David R Morris
(74) *Attorney, Agent, or Firm* — Warner Norcross + Judd LLP

(57) ABSTRACT

A method is disclosed for monitoring the functions of a friction clutch which is arranged in a vehicle between a drive motor and a compressor of a compressed air supply system and which can be disengaged and engaged pneumatically. In a delivery mode of the compressor, at least one operating parameter is detected by sensor and evaluated in an electronic control unit. When a slipping condition of the friction clutch is identified, a value for a cut-off pressure of the compressor stored in the electronic control unit is reduced. When a slipping condition has been identified, the delivery mode of the compressor is ended by disengagement of the friction clutch, and a warning signal and/or warning information is outputted.

6 Claims, 3 Drawing Sheets

(51) Int. Cl.
*G07C 5/00* (2006.01)
*G07C 5/08* (2006.01)

(52) U.S. Cl.
CPC .... *G07C 5/0833* (2013.01); *F16D 2500/1028* (2013.01); *F16D 2500/1045* (2013.01); *F16D 2500/10437* (2013.01); *F16D 2500/1112* (2013.01); *F16D 2500/3024* (2013.01); *F16D 2500/30406* (2013.01); *F16D 2500/3166* (2013.01); *F16D 2500/5102* (2013.01); *F16D 2500/70406* (2013.01); *F16D 2500/7103* (2013.01); *F16D 2500/7104* (2013.01)

(58) Field of Classification Search
CPC ..... F16D 2500/1045; F16D 2500/3024; F16D 2500/30406; F16D 2500/3166; F16D 2500/5102; F16D 2500/70406; F16D 2500/70424; F16D 2500/7103; F16D 2500/7104
See application file for complete search history.

(56) References Cited

U.S. PATENT DOCUMENTS

| | | |
|---|---|---|
| 2008/0173033 A1 | 7/2008 | Colavincenzo |
| 2009/0127926 A1 | 5/2009 | Fries et al. |
| 2011/0020138 A1 | 1/2011 | Mellar et al. |

FOREIGN PATENT DOCUMENTS

| | | |
|---|---|---|
| DE | 102008005437 A1 | 7/2009 |
| DE | 102008013169 A1 | 9/2009 |
| FR | 2743128 A1 | 7/1997 |
| GB | 2258283 A | 2/1993 |

OTHER PUBLICATIONS

Machine assisted English translation of FR2743128A1 obtained from htttps://patents.google.com/patent on Aug. 19, 2020, 10 pages.
Machine assisted English translation of DE102008003957A1 obtained from https://patents.google.com/patent on Aug. 19, 2020, 14 pages.
Machine assisted English translation of DE102008013169A1 obtained from https://patents.google.com/patent on Aug. 19, 2020, 8 pages.

* cited by examiner

METHOD FOR MONITORING THE FUNCTIONS OF A FRICTION CLUTCH

CROSS-REFERENCE TO RELATED APPLICATIONS

This application is the National Stage of International Application No. PCT/EP2019/054067, filed on 19 Feb. 2019, which claims priority to and all advantages of German Patent Application No. 10 2018 104 161.6, filed on 23 Feb. 2018, the content of which is hereby incorporated by reference

FIELD OF THE DISCLOSURE

The invention relates to a method for monitoring the functions of a friction clutch which is arranged in a vehicle between a drive motor and a compressor of a compressed air supply system and can be disengaged and engaged pneumatically, wherein, in the delivery mode of the compressor, at least one operating parameter is detected by sensor and evaluated in an electronic control unit and, when a slipping condition of the friction clutch is identified by the electronic control unit, a value for a cut-off pressure of the compressor stored in the electronic control unit is reduced.

BACKGROUND

In vehicles, in particular heavy road vehicles and rail vehicles, it is conventional to use compressed air braking systems, which in each case are supplied by a compressed air supply system with cleaned and dried compressed air. Modern electronically controlled compressed air supply systems have a compressed air conditioning system with filter and dryer units, a multiple-circuit safety valve with overflow valves of multiple compressed air consumer circuits, and an electronic control unit, with which pressure sensors for detecting supply pressures may also be associated. By means of a compressor, which is conventionally of the piston type and can be coupled with the drive motor of the vehicle in question by engagement of a friction clutch, air is taken in from the surroundings in the delivery mode, compressed and conveyed via a dryer line of the compressed air conditioning unit into at least one main supply line. From the main supply line, multiple supply lines of compressed air consumer circuits branch via in each case an overflow valve of a multiple-circuit safety valve. A pressure sensor for detecting the supply pressure is conventionally connected to the main supply line and/or the supply lines of at least some compressed air consumer circuits.

The compressor is switched into delivery mode by engagement of the associated friction clutch when a supply pressure $p_{sys}$ detected by sensor reaches or falls below a predetermined cut-on pressure $p_{cut-on}$ and is cut off by disengagement of the friction clutch when the supply pressure $p_{sys}$ reaches or exceeds a predetermined cut-off pressure $p_{cut-off}$.

The construction of a friction clutch which is arranged between a drive motor and a compressor and can be engaged and disengaged pneumatically is known, for example, from DE 10 2008 003 957 A1. In that friction clutch, a clutch disk which is connected in a rotationally secure manner to a drive shaft of a drive motor and provided with friction linings is clamped in a pressure plate by a pressure spring. The pressure plate is connected in a rotationally secure manner to a drive shaft of the compressor. By applying a high control pressure to an axially adjacent pressure chamber, the clamping of the clutch disk can be released via a release piston which is guided in an axially movable manner in the pressure chamber and which is in switching connection via a release bearing and a release mechanism with the pressure plate. The friction clutch is accordingly engaged when the pressure chamber is pressureless and disengaged when pressure is applied to the pressure chamber. The switching pressure of the friction clutch is controlled via an associated compressor control valve, which can be actuated by the electronic control unit of the compressed air supply system.

If a slipping condition of the friction clutch occurs in the delivery mode of the compressor, that is to say when the friction clutch is engaged and the drive motor is running, the designated cut-off pressure $p_{cut-off}$ can no longer be reached and overheating and thermal destruction of the friction clutch occur relatively quickly. A destroyed friction clutch results in total failure of the compressor, so that the vehicle in question is able to travel further by only a limited distance, which is determined substantially by the compressed air stored in the service brake circuits. In most cases, the vehicle then stops somewhere and must then be either repaired on site or towed to a garage. The cause of a slipping friction clutch is usually heavily worn friction linings. A slipping friction clutch can, however, also be caused by a fatigued or broken pressure spring, a jammed release piston or a defective compressor control valve.

In order to prevent failure of a friction clutch of a compressor, the friction clutch is often replaced with a new or reconditioned friction clutch as a precaution during servicing in garages, even though the friction linings of the existing friction clutch in particular are still suitable for a longer operating time or distance. There is therefore a need for a method for monitoring the functions of a friction clutch of a compressor with which heavy clutch wear and a slipping condition of a friction clutch can be identified and measures can be taken for limited further operation of the compressor and thus for further travel of the vehicle in question at least to the nearest garage.

DE 10 2008 003 957 A1 describes a method of this type, in which a friction clutch that is slipping in the delivery mode of a compressor is identified in that the rotational speeds, detected by sensor, of the drive motor and of the compressor differ from one another. When a slipping condition of the friction clutch has been identified, the cut-off pressure of the compressor is reduced stepwise until, within a predetermined tolerance range, there is no longer any difference in rotational speed between the rotational speed of the motor and the rotational speed of the compressor, that is to say the friction clutch is no longer in the slipping condition. Limited further travel of the vehicle at least to the nearest garage is possible with the supply pressure $p_{sys}$ of the compressed air consumer circuits, in particular of the service brake circuits, so reduced.

However, the above-described method disadvantageously requires a rotational speed sensor which is arranged on the drive shaft or another rotating component of the compressor and measures the rotational speed thereof, which rotational speed sensor increases the manufacturing costs and is often not present. Accordingly, the object underlying the present invention was to provide a method for monitoring the functions of a friction clutch in the drive train of a compressor of the type mentioned at the beginning, which method manages with the sensors that are conventionally present in an electronically controlled compressed air supply system, that is to say does not require the arrangement of an additional sensor.

BRIEF SUMMARY

The method according to the invention for monitoring the functions of a friction clutch provides that, in the delivery mode of the compressor, a supply pressure $p_{sys}$ in a main supply line of multiple compressed air consumer circuits or in a supply line of at least one compressed air consumer circuit is continuously detected by sensor, that a slipping condition of the friction clutch is identified in that the supply pressure $p_{sys}$ remains at a constant plateau pressure $p_{PI}$, which is below the cut-off pressure $p_{cut-off}$ of the compressor ($p_{PI} < p_{cut-off}$), within a predetermined tolerance range $\Delta p_T$ and within a predetermined holding time period $T_H$, and that, when a slipping condition of the friction clutch has been identified, the delivery mode of the compressor is ended by disengagement of the friction clutch, the value for the cut-off pressure $p_{cut-off}$ of the compressor is reduced to a corrected cut-off pressure $p_{cut-off\_c}$, which lies below the plateau pressure $p_{PI}$ by a predetermined pressure difference $\Delta p_c$ ($p_{cut-off\_c} = p_{PI} - \Delta p_c$), and a warning signal and/or warning information is outputted.

Accordingly, the method according to the invention starts from a friction clutch which, in a manner known per se, is arranged in a vehicle between a drive motor and a compressor of a compressed air supply system and can be disengaged and engaged pneumatically. By detecting by sensor a supply pressure $p_{sys}$ in a main supply line of multiple compressed air consumer circuits upstream of a multiple-circuit safety valve or in a supply line of at least one compressed air consumer circuit downstream of an overflow valve of the multiple-circuit safety valve, the measured values of a pressure sensor that is already present in an electronically controlled compressed air supply system are utilized according to this method. On the basis of the development of a largely constant plateau pressure $p_{PI}$, which is below the previously specified value for the cut-off pressure $p_{cut-off}$ ($p_{PI} < p_{cut-off}$), it is recognized that the friction clutch is in the slipping condition and therefore the cut-off pressure $p_{cut-off}$ cannot be reached.

In order to prevent permanent destruction of the friction clutch, the delivery mode of the compressor is then first ended by disengagement of the friction clutch. In addition, the value for the cut-off pressure $p_{cut-off}$ of the compressor stored in the electronic control device of the compressed air supply system is reduced to a corrected cut-off pressure value $p_{cut-off\_c}$, which lies below the plateau pressure $p_{PI}$ by a predetermined pressure difference $p_c$ ($p_{cut-off\_c} = p_{PI} - p_c$).

As a result, owing to a correspondingly lower delivery load of the compressor in subsequent delivery modes, a slipping condition of the friction clutch is avoided but a limited compressed air supply to the compressed air consumer circuits, in particular the service brake circuits, is maintained. Finally, the driver is made aware of the limited function of the compressor and thus of a limited compressed air supply in particular to the service brake circuits of the vehicle by the outputting of a warning signal and/or warning information.

It is then up to the discretion of the driver of the vehicle whether he drives a more or less long distance further before driving to a garage for repair of the friction clutch or compressor, or whether he looks for a garage for this purpose immediately or by the shortest route. The method according to the invention at least prevents the vehicle in question from stopping on the road with a completely failed compressed air supply and then having to be either repaired on site or towed to a garage.

Because it is possible that the friction clutch on the compressor is not completely engaged, and is therefore in the slipping condition, for example, because of a jammed release piston of the friction clutch or a jammed operating piston of the compressor control valve, it can also be provided that the value of the cut-off pressure $p_{cut-off}$ for the compressor is reduced to a corrected cut-off pressure value $p_{cut-off\_c}$ and a warning signal and/or warning information is outputted only when the supply pressure $p_{sys}$ remains at a constant plateau pressure $p_{PI}$, which is below the cut-off pressure value $p_{cut-off}$ of the compressor ($p_{PI} < p_{cut-off}$), in each of multiple successive delivery mode phases $T_{F1}$, $T_{F2}$, $T_{F3}$, ... $T_{Fn}$ of the compressor. If the slipping condition of the friction clutch is a one-off malfunction which can be eliminated by repeated engagement and disengagement of the friction clutch, the cut-off pressure $p_{cut-off}$ is reached again in subsequent delivery mode phases, so that the measures provided for protecting the friction clutch and for enabling the vehicle to travel further can remain undone.

In order to prevent thermal overloading and destruction of the friction clutch, it is preferably provided that a predetermined minimum cooling time $T_{cd}$, in which the friction clutch remains disengaged, is observed between successive delivery mode phases $T_{F1}$, $T_{F2}$, $T_{F3}$, ... $T_{Fn}$ of the compressor. This minimum cooling time $T_{cd}$ should also be observed when the supply pressure $p_{sys}$ has reached or fallen below the cut-on pressure value $p_{cut-on}$, since otherwise destruction of the friction clutch and consequently a total failure of the compressed air supply is to be expected.

In order to inform the driver of the vehicle in an appropriate manner of the reduced delivery capacity of the compressor and the consequently reduced cut-off pressure value $p_{cut-off\_c}$ of the supply pressure $p_{sys}$, it is advantageous according to a further development of the invention if the working pressure range $\Delta p_{sys}$ of the compressor between the cut-on pressure $p_{cut-on}$ and the cut-off pressure $p_{cut-off}$ is divided into multiple partial pressure ranges A, B, C and that, depending on the partial pressure range A, B, C in which the corrected cut-off pressure value $p_{cut-off\_c}$ is situated, different warning signals and/or warning information adapted to the particular partial pressure range A, B, C in question are outputted. It is, however, also possible to define and use only a single pressure range for this purpose.

In accordance with this strategy, it is provided that the working pressure range $\Delta p_{sys}$ of the compressor between the cut-on pressure value $p_{cut-on}$ and the cut-off pressure value $p_{cut-off}$ is divided into three partial pressure ranges A, B, C, and that, when the corrected cut-off pressure value $p_{cut-off\_c}$ is within the upper partial pressure range A, warning information is outputted that informs the driver of the slightly reduced cut-off pressure value $p_{cut-off\_c}$ and asks him to drive to a garage within a relatively long operating time or distance traveled. In this case, the warning information displayed on a display and/or outputted by speech via a loudspeaker can be, for example, "Supply pressure reduced slightly! Visit a garage within an operating time of three days or after travelling a distance of 1000 km!".

In contrast, when the corrected cut-off pressure value $p_{cut-off\_c}$ is within the middle partial pressure range B, corresponding warning information is outputted that informs the driver of the significantly reduced cut-off pressure value $p_{cut-off\_c}$ and asks him to drive to a garage within a shorter operating time or distance traveled. In this case, the warning information displayed on a display and/or outputted by speech via a loudspeaker can be, for example, "Supply pressure reduced! Visit a garage after the current journey or after travelling a maximum distance of 300 km!".

When the corrected cut-off pressure value $p_{cut-off\_c}$ is within the lower partial pressure range C, however, corresponding warning information is outputted that informs the driver of the considerably reduced cut-off pressure $p_{cut-off\_c}$ and asks him to drive to a garage immediately and by the shortest route. In this case, the warning information displayed on a display and/or outputted by speech via a loudspeaker can be, for example, "Supply pressure considerably reduced! Visit a garage immediately!".

For displaying the supply pressure $p_{sys}$ in relation to the cut-on pressure value $p_{cut-on}$ and cut-off pressure value $p_{cut-off}$, $p_{cut-off\_c}$ for the compressor and for outputting a warning signal, it can be provided that the current supply pressure $p_{sys}$ and also the cut-on pressure value $p_{cut-on}$ and the cut-on pressure value $p_{cut-off}$ or the corrected cut-on pressure value $p_{cut-off\_c}$ for the compressor are displayed in a display instrument and that, when a reduced cut-off pressure value $p_{cut-off\_c}$ is present, an associated warning lamp illuminates and/or an acoustic warning signal is outputted.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 2:
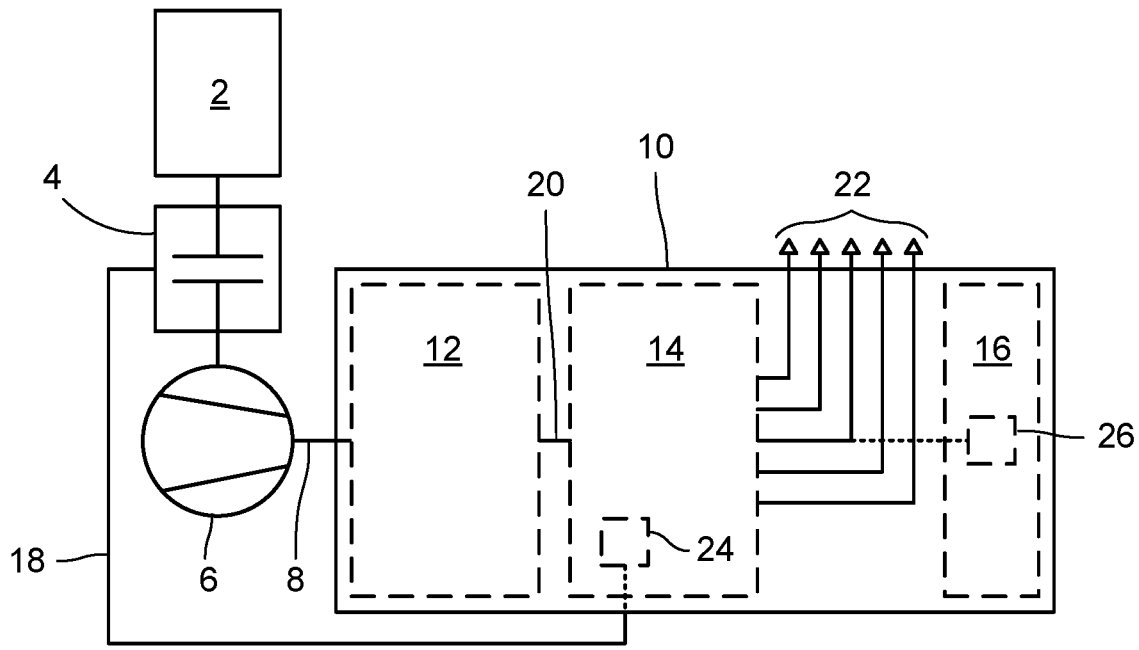
FIG. 2 shows the schematic layout of a typical compressed air supply system of a vehicle.

FIG. 2 shows, in schematic form, a compressor 6 and an electronically controlled compressed air supply system 10 of a vehicle, in which the method according to the invention for monitoring the functions of a friction clutch 4 can be used. The friction clutch 4 is arranged between a drive motor 2 of the vehicle and the compressor 6 and can be disengaged and engaged pneumatically. The compressed air supply system 10 comprises the assembly groups of a compressed air conditioning unit 12, a multiple-circuit safety valve unit 14 and an electronic control unit 16.

Connected to a control pressure input of the friction clutch 4 is a control pressure line 18. When the control pressure line 18 is pressureless, the friction clutch 4 is engaged, so that the compressor 6 is in delivery mode when the drive motor 2 is running. When the control pressure line 18 is under a sufficiently high control pressure, the friction clutch 4 is disengaged, whereby the compressor 6 is cut off. In delivery mode, the compressor 6 takes in air from the surroundings and conveys it in the form of compressed air into a conveying line 8 connected to the compressed air conditioning unit 12.

In the compressed air conditioning unit 12, the conveyed compressed air is cleaned and also dried and passes on the output side into a main supply line 20. In the multiple-circuit safety valve unit 14, the main supply line 20 branches via in each case an overflow valve of a multiple-circuit safety valve into supply lines 22 of multiple compressed air consumer circuits. Within the multiple-circuit safety valve 14 there is also arranged a compressor control valve 24, which can be actuated by an electronic control unit of the control unit 16 and via which the control pressure line 18 of the friction clutch 4 can either be switched in a pressureless manner or subjected to a control pressure. Within the control unit 16 there is also arranged at least one pressure sensor 26, by means of which the supply pressure $p_{sys}$ can be detected by sensor in the main supply line 20 upstream of the multiple-circuit safety valve or in one of the supply lines 22 downstream of the associated overflow valve of the multiple-circuit safety valve. In the present case, the pressure sensor is connected by way of example to a supply line 22 of one of the compressed air consumer circuits.

Operational control of the compressor 6 conventionally takes place in such a manner that, when the drive motor 2 is running, the compressor is cut on, that is to say switched into the delivery mode, by engagement of the friction clutch 4 when the supply pressure $p_{sys}$ has reached or fallen below a predetermined cut-on pressure value $p_{cut-on}$ ($p_{sys} \leq p_{cut-on}$). Likewise, the compressor 6 is cut off by disengagement of the friction clutch 4 when the supply pressure $p_{sys}$, during the delivery mode, has reached or exceeded a predetermined cut-off pressure value $p_{cut-off}$ ($p_{sys} \geq p_{cut-off}$).

Figure 1:
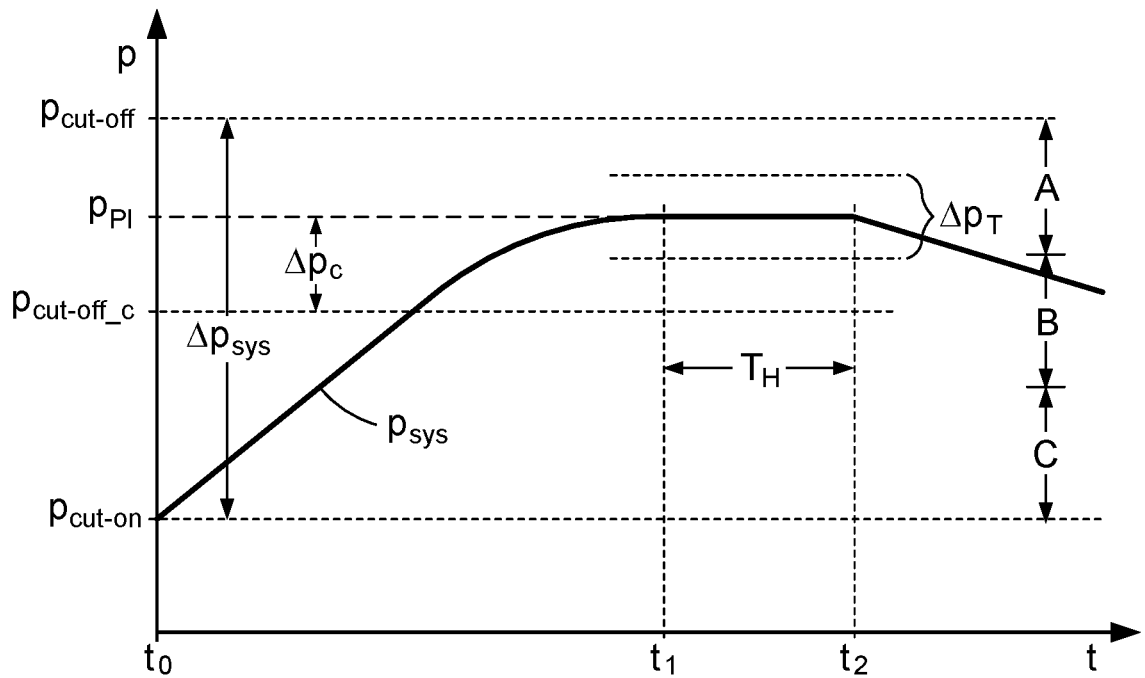
FIG. 1 is a diagram showing the evolution over time of a supply pressure during a delivery mode of a compressor.

The diagram according to FIG. 1 shows the evolution over time of a supply pressure $p_{sys}$ during a delivery mode of the compressor 6, that is to say when the drive motor 2 is running and the friction clutch 4 is engaged. The delivery mode of the compressor 6 begins at time to and ends at time $t_2$. From time $t_1$, the supply pressure $p_{sys}$ remains at a largely constant plateau pressure value $p_{Pl}$, which is below the cut-off pressure value $p_{cut-off}$ ($p_{Pl} < p_{cut-off}$). In this case, it is highly likely that the friction clutch 4 is in a slipping condition, which on the one hand means that the supply pressure $p_{sys}$ cannot reach the cut-off pressure value $p_{cut-off}$. More seriously, however, a prolonged slipping condition of the friction clutch 4 leads to thermal destruction of the friction clutch 4 and consequently to failure of the compressor 6. Because the compressed air supply to the compressed air consumer circuits, in particular also to the service brake circuits of the vehicle, fails as a result, the vehicle may stop on the open road and must then be repaired on site or towed to a garage for repair.

The method described hereinbelow for monitoring the functions of such a friction clutch 4 serves to prevent destruction of the friction clutch 4 and to maintain a limited functionality of the compressed air supply to the compressed air supply circuits, in particular the service brake circuits.

The method according to the invention provides that, in the delivery mode of the compressor 6, a supply pressure $p_{sys}$ in a main supply line 20 of multiple compressed air consumer circuits or in a supply line 22 of at least one compressed air consumer circuit is continuously detected by sensor, and that a slipping condition of the friction clutch 4 is identified in that the supply pressure $p_{sys}$ remains at a constant plateau pressure level $p_{Pl}$, which is below the cut-off pressure value $p_{cut-off}$ of the compressor ($p_{Pl} < p_{cut-off}$), within a predetermined holding time period $T_H$ and a predetermined tolerance range $\Delta p_T$, and that, when a slipping condition of the friction clutch 4 has been identified, the delivery mode of the compressor 6 is ended by disengagement of the friction clutch 4, the cut-off pressure value $p_{cut-off}$ of the compressor 6 is reduced to a corrected cut-off pressure value $p_{cut-off\_c}$, which lies below the plateau pressure value $p_{PI}$ by a predetermined pressure difference $\Delta p_c$ ($p_{cut-off\_c} = p_{PI} - p_c$), and a warning signal and/or warning information is outputted.

By detecting the supply pressure $p_{sys}$ by sensor, the method according to the invention utilizes a pressure sensor 26 that is already present in an electronically controlled compressed air supply system. On the basis of the development of a largely constant plateau pressure value $p_{PI}$, which is below the cut-off pressure value $p_{cut-off}$ ($p_{PI} < p_{cut-off}$), it is identified that the friction clutch 4 is in the slipping condition and therefore the cut-off pressure value $p_{cut-off}$ cannot be reached.

In order to prevent permanent destruction of the friction clutch 4, the delivery mode of the compressor 6 is then first ended by disengagement of the friction clutch 4. In addition, the cut-off pressure value $p_{cut-off}$ of the compressor 6 stored in the electronic control device of the compressed air supply system 10 is reduced to a corrected cut-off pressure value $p_{cut-off\_c}$, which lies below the plateau pressure value $p_{PI}$ by a predetermined pressure difference $p_c$ ($p_{cut-off\_c} = p_{PI} - p_c$). Thus, owing to a correspondingly lower delivery load of the compressor 6 in subsequent delivery modes, a slipping condition of the friction clutch 4 is avoided but a limited compressed air supply to the compressed air consumer circuits, in particular the service brake circuits, is maintained.

Finally, the driver is made aware of the limited function of the compressor 6 and thus of a limited compressed air supply in particular to the service brake circuits of the vehicle by the outputting of a warning signal and/or of warning information. It is then up to the discretion of the driver whether he drives a more or less long distance further before driving to a garage for repair of the friction clutch 4 or compressor 6, or whether he looks for a garage for this purpose immediately and by the shortest route. The method according to the invention at least prevents the vehicle in question from stopping on the road with a completely failed compressed air supply and then having to be either repaired on site or towed to a garage.

In a further development of the method according to the invention, which is likewise shown in the diagram according to FIG. 1, it is provided that the working pressure range $\Delta p_{sys}$ of the compressor 6 between the cut-on pressure value $p_{cut-on}$ and the cut-off pressure value $p_{cut-off}$ is divided into multiple partial pressure ranges A, B, C. Depending on the partial pressure range A, B, C in which the corrected cut-off pressure value $p_{cut-off\_c}$ is situated, different warning signals and/or warning information adapted to the particular partial pressure range A, B, C in question are outputted. In the present case, the working pressure range $\Delta p_{sys}$ of the compressor 6 is divided into three partial pressure ranges A, B, C, an upper partial pressure range A, a middle partial pressure range B and a lower partial pressure range C.

Since the corrected cut-off pressure value $p_{cut-off\_c}$ of the compressor 6 in the present case is situated in the middle partial pressure range B, for example, corresponding warning information is outputted that informs the driver of the significantly reduced cut-off pressure value $p_{cut-off\_c}$ and asks him to drive to a garage within a relatively short operating time or distance traveled. Corresponding warning information which is displayed on a display and/or outputted by speech via a loudspeaker could be as follows: "Supply pressure reduced! Find a garage after the current journey or after travelling a maximum distance of 300 km!".

Figure 3:
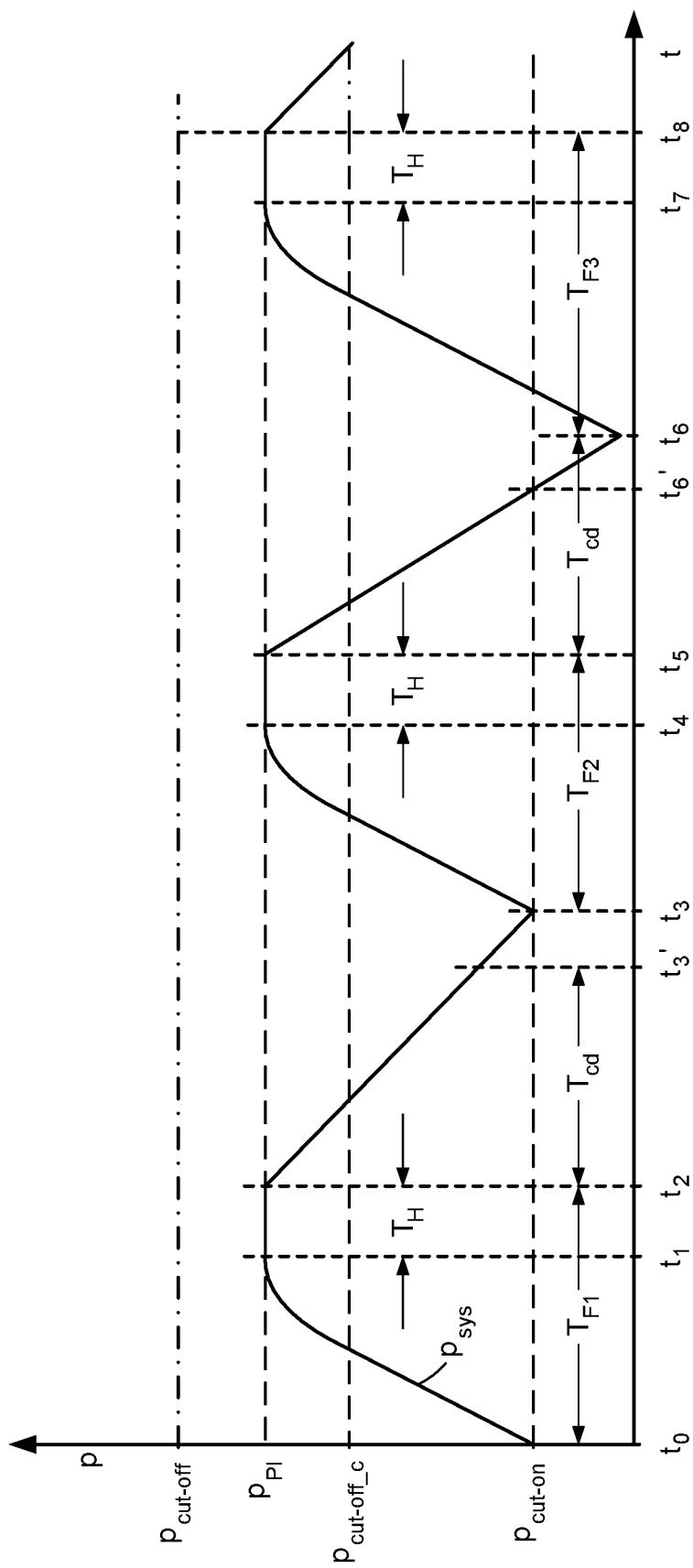
FIG. 3 is a diagram showing the evolution over time of a supply pressure during three successive delivery modes of a compressor.

In a further development of the method according to the invention shown in the diagram according to FIG. 3, it is provided that the cut-off pressure value $p_{cut-off}$ of the compressor 6 is reduced to a corrected cut-off pressure value $p_{cut-off\_c}$ and a warning signal and/or warning information is outputted only when the supply pressure $p_{sys}$ remains at an at least largely constant plateau pressure value $p_{PI}$, which is below the cut-off pressure value $p_{cut-off}$ of the compressor ($p_{PI} < p_{cut-off}$), in each of multiple successive delivery mode phases $T_{F1}, T_{F2}, T_{F3}, \ldots T_{Fn}$ of the compressor 6. In the present case there are provided by way of example three successive delivery mode phases $T_{F1}, T_{F2}, T_{F3}$ of the compressor 6, between which a predetermined minimum cooling time $T_{cd}$, in which the friction clutch remains disengaged 4, is observed.

The first delivery mode phase $T_{F1}$ of the compressor 6 takes place between times $t_0$ and $t_2$. The second delivery mode phase $T_{F2}$ of the compressor 6 begins at time $t_3$ and ends at time $t_5$. The third delivery mode phase $T_{F3}$ of the compressor 6 takes place between times to and to. Between the first delivery mode phase $T_{F1}$ and the second delivery mode phase $T_{F2}$ of the compressor, the minimum cooling time $T_{cd}$, which ends at time $t_3'$, is exceeded since the supply pressure $p_{sys}$, because of low compressed air consumption, reaches the cut-on pressure value $p_{cut-on}$ of the compressor 6 only after the minimum cooling time $T_{cd}$ has passed. Between the second delivery mode $T_{F2}$ and the third delivery mode $T_{F3}$ of the compressor 6, the minimum cooling time $T_{cd}$ is observed, even though the supply pressure $p_{sys}$, because of increased compressed air consumption, has reached and exceeded the cut-on pressure $p_{cut-on}$ of the compressor 6 before at time $t_6'$.

By waiting for multiple successive delivery mode phases $T_{F1}, T_{F2}, T_{F3}$ of the compressor 6 before the cut-off pressure value $p_{cut-off}$ is reduced, account is taken of a situation in which a slipping condition of the friction clutch 4 is attributable to a one-off effect, such as, for example, an incompletely engaged state due to a jammed release piston of the friction clutch 4 or a jammed operating piston of the compressor control valve 24, which can be eliminated by repeated disengagement and engagement of the friction clutch 4. Only when a slipping condition of the friction clutch 4 has identifiably occurred in multiple successive delivery mode phases $T_{F1}, T_{F2}, T_{F3}$ of the compressor 6 is it assumed that the friction clutch 4 is permanently damaged, for example as a result of worn friction linings, and the cut-off pressure value $p_{cut-off}$ of the compressor 6 reduced to the corrected cut-off pressure value $p_{cut-off\_c}$. By observing the minimum cooling time $T_{cd}$ between the delivery mode phases $T_{F1}, T_{F2}, T_{F3}$ of the compressor 6, thermal overloading and destruction of the friction clutch 4 is prevented.

Figure 4A:
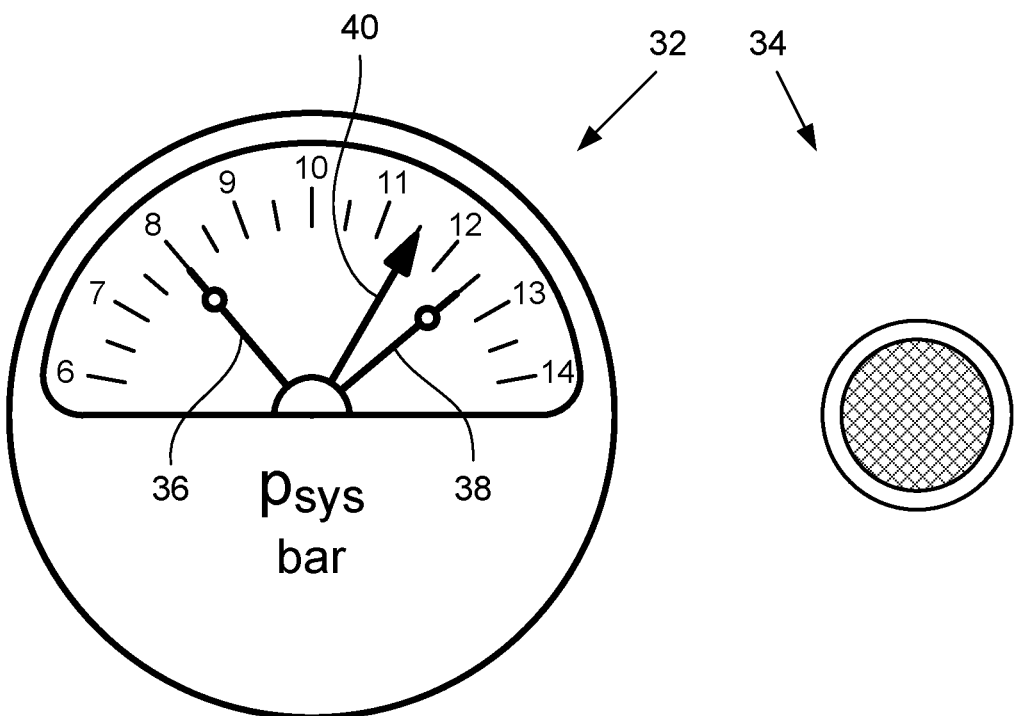
FIG. 4a shows two combined display instruments in the case where the cut-off pressure of the compressor has not been reduced.
Figure 4B:
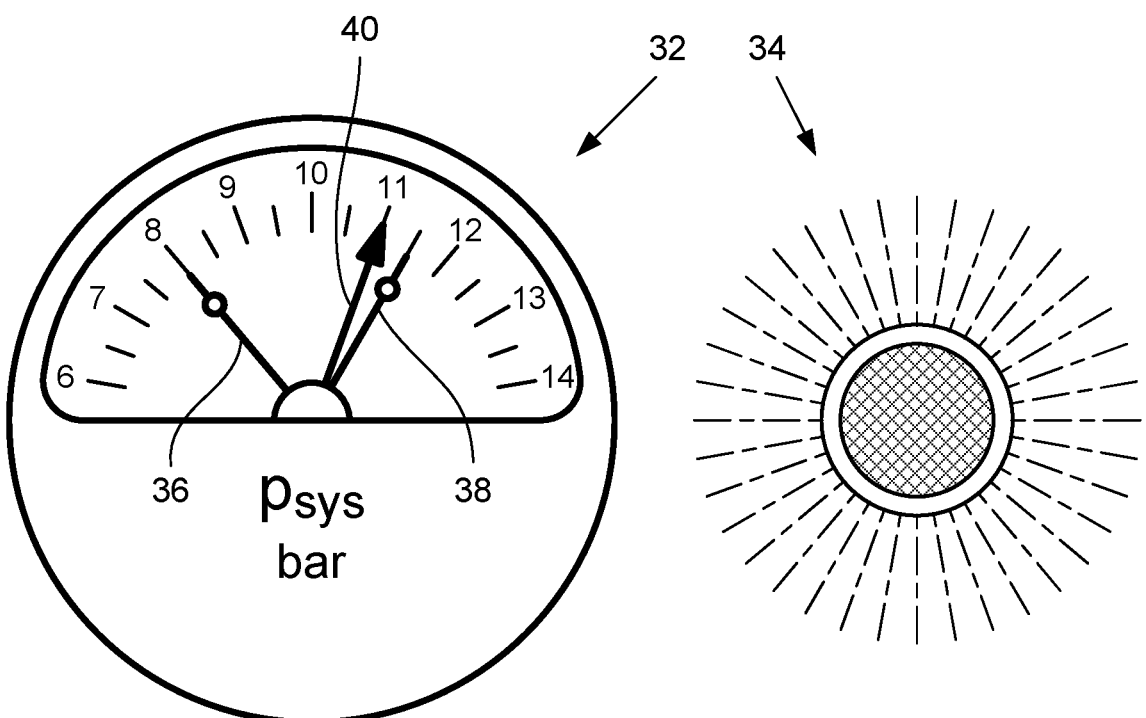
FIG. 4b shows the two combined display instruments according to FIG. 4a in the case where the cut-off pressure of the compressor has been reduced.

FIGS. 4a and 4b depict in each case a combination of two display instruments 32, 34 with which the driver of a vehicle can be informed of the current supply pressure $p_{sys}$ and a possibly reduced cut-off pressure value $p_{cut-off\_c}$ of the compressor 6. The first display instrument 32 is a display instrument which has a pressure scale from 6 bar to 14 bar. The cut-on pressure $p_{cut-on}$ of the compressor 6 is indicated by a first stationary pointer 36. The cut-off pressure value $p_{cut-off}$ of the compressor 6, which may also be the reduced cut-off pressure value $p_{cut-off\_c}$, is indicated by a second stationary pointer 38. The current supply pressure $p_{sys}$ detected by sensor is indicated by a dynamic pointer 40. The second display instrument 34 is a warning lamp. The two display instruments 32, 34 are preferably arranged side by side in a dashboard or instrument panel of the vehicle in question.

In the case of normal operation, shown in FIG. 4a, of the compressed air supply system 10, or of the associated compressor 6, the cut-on pressure value $p_{cut-on}$ indicated by the first stationary pointer 36 is set at a value of 8 bar. The cut-off pressure value $p_{cut-off}$ indicated by the second stationary pointer 38 is set at a value of 12.5 bar. A current supply pressure $p_{sys}$ of 11.5 bar is indicated by means of the dynamic pointer 40. The warning lamp 34 is off.

In the case of emergency operation, shown in FIG. 4b, of the compressed air supply system 10, or of the associated compressor 6, according to one of the method variants described above, the cut-on pressure value $p_{cut-on}$ is set unchanged at a value of 8 bar. The cut-off pressure value $p_{cut-off}$, however, owing to a previously determined slipping condition of the friction clutch 4, has been reduced to a corrected cut-off pressure value $p_{cut-off\_c}$ of in the present case 11.5 bar, which is now indicated by the second stationary pointer 38. A current supply pressure $p_{sys}$ of 11 bar is indicated by the dynamic pointer 40. Owing to the emergency operation, the warning lamp 34 is on, whereby the driver is made aware of the limited compressed air supply.

LIST OF REFERENCE SYMBOLS (PART OF THE DESCRIPTION)

2 drive motor
4 friction clutch
6 compressor
8 conveying line
10 compressed air supply system
12 compressed air conditioning unit
14 multiple-circuit safety valve unit
16 electronic control unit
18 control pressure line
20 main supply line
22 supply lines
24 compressor control valve
26 pressure sensor
32 first display instrument, display instrument
34 second display instrument, warning lamp
36 first stationary pointer
38 second stationary pointer
40 dynamic pointer
A upper partial pressure range
B middle partial pressure range
C lower partial pressure range
P pressure
$p_{cut-off}$ cut-off pressure value
$p_{cut-off\_c}$ corrected cut-off pressure value
$p_{cut-on}$ cut-on pressure value
$p_{Pl}$ plateau pressure
$p_{sys}$ supply pressure
t time
$t_0$-$t_8$ times
$t_3'$, $t_6'$ times
T period of time (generally)
$T_{cd}$ minimum cooling time
$T_{F1}$ first delivery mode phase
$T_{F2}$ second delivery mode phase
$T_{F3}$ third delivery mode phase
$T_{Fn}$ $n^{th}$ delivery mode phase
$T_H$ holding time period
$\Delta p$ pressure difference (generally)
$\Delta p_c$ pressure difference
$\Delta p_{sys}$ working pressure range
$\Delta p_T$ tolerance range The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims. The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method for monitoring the functions of a friction clutch which is arranged in a vehicle between a drive motor and a compressor of a compressed air supply system and which can be disengaged and engaged pneumatically, said method comprising:

detecting by sensor and evaluating in an electronic control unit at least one operating parameter in a delivery mode of the compressor, wherein when a slipping condition of the friction clutch is identified by the electronic control unit, a value for a cut-off pressure of the compressor stored in the electronic control unit is reduced, wherein in the delivery mode of the compressor, a supply pressure in a main supply line of multiple compressed air consumer circuits or in a supply line of at least one compressed air consumer circuit is continuously detected by sensor, wherein a slipping condition of the friction clutch is identified in that the supply pressure remains at a constant pressure plateau, which is below the cut-off pressure of the compressor, within a predetermined tolerance range and within a predetermined holding time period, and wherein when a slipping condition of the friction clutch has been identified, the delivery mode of the compressor is ended by disengagement of the friction clutch, the value for the cut-off pressure of the compressor is reduced to a corrected cut-off pressure, which lies below the plateau pressure by a predetermined pressure difference, and a warning signal and/or warning information is outputted.

2. The method as claimed in claim 1, wherein the value for the cut-off pressure of the compressor is reduced to a corrected cut-off pressure value and a warning signal and/or warning information is outputted only when the supply pressure remains at a constant pressure plateau, which is below the cut-off pressure value of the compressor, in each of multiple successive delivery mode phases of the compressor.

3. The method as claimed in claim 2, wherein a predetermined minimum cooling time, in which the friction clutch remains disengaged, is observed between successive delivery mode phases of the compressor.

4. The method as claimed in claim 1, wherein the working pressure range of the compressor between the cut-on pressure and the cut-off pressure is divided into one or more partial pressure ranges, and wherein, depending on the partial pressure range in which the corrected cut-off pressure value is situated, different warning signals and/or warning information adapted to the particular partial pressure range in question are outputted.

5. The method as claimed in claim 4, wherein the working pressure range of the compressor between the cut-on pressure and the cut-off pressure is divided into three partial pressure ranges, and wherein, when the corrected cut-off pressure value is within the upper partial pressure range, warning information is outputted that informs the driver of the slightly reduced cut-off pressure and asks him to drive to a garage within a relatively long operating time or distance traveled, and wherein, when the corrected cut-off pressure value is within the middle partial pressure range, warning information is outputted that informs the driver of the significantly reduced cut-off pressure and asks him to drive to a garage within a shorter operating time or distance traveled, and wherein, when the corrected cut-off pressure value is within the lower partial pressure range, warning information is outputted that informs the driver of the considerably reduced cut-off pressure and asks him to drive to a garage immediately and by the shortest route.

6. The method as claimed in claim 1, wherein the current supply pressure and also the value of the cut-on pressure and the value of the cut-off pressure or the value of the corrected cut-off pressure of the compressor are displayed in a display instrument, and wherein, when a reduced cut-off pressure value is present, an associated warning lamp illuminates and/or an acoustic warning signal is outputted.

* * * * *